(12) United States Patent
Martin et al.

(10) Patent No.: US 11,487,592 B2
(45) Date of Patent: Nov. 1, 2022

(54) DYNAMIC APPLICATION MIGRATION ACROSS STORAGE PLATFORMS

(71) Applicant: EMC IP Holding Company LLC, Hopkinton, MA (US)

(72) Inventors: Owen Martin, Hopedale, MA (US); Michael E. Specht, Bolton, MA (US); Benjamin A. Randolph, Uxbridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 287 days.

(21) Appl. No.: 16/749,516

(22) Filed: Jan. 22, 2020

(65) Prior Publication Data
US 2021/0224137 A1 Jul. 22, 2021

(51) Int. Cl.
*G06F 9/46* (2006.01)
*G06F 9/50* (2006.01)
*G06F 3/06* (2006.01)

(52) U.S. Cl.
CPC .......... *G06F 9/5088* (2013.01); *G06F 3/067* (2013.01); *G06F 3/0613* (2013.01); *G06F 3/0631* (2013.01); *G06F 3/0659* (2013.01); *G06F 3/0689* (2013.01); *G06F 9/5011* (2013.01); *G06F 2209/508* (2013.01); *G06F 2209/5019* (2013.01); *G06F 2209/5022* (2013.01)

(58) Field of Classification Search
CPC .... G06F 9/5088; G06F 9/5011; G06F 3/0613; G06F 3/0631; G06F 3/0659; G06F 3/067; G06F 3/0689; G06F 2209/5019; G06F 2209/5022; G06F 2209/508
See application file for complete search history.

(56) References Cited

U.S. PATENT DOCUMENTS

| | | | |
|---|---|---|---|
| 6,553,476 B1* | 4/2003 | Ayaki | G06F 3/0655 710/36 |
| 2015/0242133 A1* | 8/2015 | Smith | G06F 3/0613 711/114 |
| 2016/0147575 A1* | 5/2016 | Singh | G06F 9/5088 718/105 |
| 2018/0150240 A1* | 5/2018 | Bernat | G06F 3/0613 |
| 2018/0285012 A1* | 10/2018 | Kazama | G06F 3/061 |

* cited by examiner

*Primary Examiner* — Diem K Cao
(74) *Attorney, Agent, or Firm* — Krishnendu Gupta; Nikhil Patel (57) ABSTRACT

Embodiments of the present disclosure relate to load balancing application processing between storage platforms. Input/output (I/O) workloads can be anticipated during one or more time-windows. Each I/O workload can comprise one or more I/O operations corresponding to one or more applications. Processing I/O operations of each application can be dynamically migrated to one or more storage platforms of a plurality of storage platforms based on the anticipated workload.

18 Claims, 6 Drawing Sheets

DYNAMIC APPLICATION MIGRATION ACROSS STORAGE PLATFORMS

BACKGROUND

A storage area network (SAN) is a dedicated high-speed network that interconnects and presents shared pools of storage devices to multiple servers. A SAN moves storage resources off common user networks and reorganizes them into an independent, high-performance network. This reorganization enables each server to access shared storage as if it were a drive directly attached to each server. Accordingly, host devices can send block-based access requests and access any storage device on the SAN. The SANs are typically assembled using three principle components: cabling, host bus adapters (HBAs), and switches attached to storage arrays and servers. Each switch and storage system of the SANs can be interconnected using techniques that support bandwidth levels required to handle peak data activities.

SUMMARY

One or more aspects of the present disclosure relates to load balancing application processing between storage platforms.

In embodiments, input/output (I/O) workloads can be anticipated during one or more time-windows. Each I/O workload can comprise one or more I/O operations corresponding to one or more applications. Processing I/O operations of each application can be dynamically migrated to one or more storage platforms of a plurality of storage platforms based on the anticipated workload.

In embodiments, response time goals associated with each application can be determined.

In embodiments, loads of each of the storage platforms can be determined.

In embodiments, I/O operation patterns of the anticipated I/O workloads can be predicted.

In embodiments, amounts of each type of I/O operation in each anticipated I/O workload can be determined to predict the I/O operation patterns. Each I/O operation type can include at least a read or write (R/W) operation.

In embodiments, each storage platform's response times for processing each application's I/O operations can be predicted.

In embodiments, one or more of each storage platform's configuration, I/O operation types in each anticipated workload, and each I/O operation's size can be determined to predict each storage platform's response times for processing each application's I/O operations.

In embodiments, each storage platform's current workload can be determined and each storage platform's response times for processing I/O operations of the current workload can be monitored. The determined current workload and monitored current workload can be used to predict each storage platform's response times for processing each application's I/O operations.

In embodiments, an amount of additional workload each storage platform can process based on the response time goals associated with each application's I/O operations can be determined. Additionally, each storage array's breaking workload can be determined. A breaking workload can correspond to an amount of time each storage array exceeds the response time goals.

In embodiments, dynamic migration of each application's I/O operations to one or more storage platforms processing can include selecting the one or more storage platforms based on one or more of the amounts of additional workload each storage platform can process and each storage array's breaking workload.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Performance of one or more applications in communication with a storage area network (SAN) can be affected by an operational quality of one or more storage devices of the SAN. To improve the SAN's performance, capacity, and/or reliability with respect to processing data received from the applications, two or more storage devices can be grouped to form a cluster within the SAN using any clustering technique. Clustering techniques enable workloads (e.g., streams of input/output (I/O) operations) to be distributed between clustered storage devices. The clustering can use one or more load-balancing methods to distributed among the clustered storage devices.

The load-balancing methods can be performed by a network appliance (e.g., physical or virtual) that identifies a storage device of a cluster that can best process one or more input/output (I/O) operations received from a client device. For example, the network appliance can identify the storage device that is available and online in response to receiving an I/O operation. Once the storage device is identified, the network appliance can route the I/O operation to the device.

Traditional load balancing methods can use a hash-based algorithm, least-connections algorithm, least-time algorithm, or round robin algorithm. The hash-based algorithm can calculate a client device's preferred storage array based on designated keys, such as HTTP headers or IP address. The least-connections algorithm can identify and route traffic to a storage device based on an amount of active transactions (e.g., a least busy device). The least-time algorithm can identify and route traffic to a storage device based on each device's response times and amount of active connections. The round robin algorithm can cycle through a list of available storage devices in a predetermined order.

The traditional load-balancing methods do not consider a source application from which I/O operations originate. Thus, a client running different applications across several storage devices can experience a degradation in application performance as their SAN scales. For example, the customer may not be aware of the best storage device from which to run an application. As such, the customer may overcommit hardware resources resulting in an inefficient use of their SAN.

Embodiments of the present disclosure relate to dynamically migrating application I/O processing across different storage device platforms within a SAN. By using the dynamic migration techniques described herein, the embodiments can, advantageously, consistently meet, e.g., a client's performance goals (e.g., response time goals). For example, the embodiments can use active-active clustered storage devices to enforce a client's service level (SL) response time targets. In embodiments, dynamic migration can include generating distributed workload models of clustered storage arrays. The embodiments can use the distributed workload models to autonomously migrate application processing between clustered storage devices to meet the SL response time goals. For example, the embodiments can use one or more machine learning (ML) engines that ingest the distributed workload models, response times, amongst other storage device parameters and telemetry information to learn behaviors of each storage device in the cluster under a variety of workload conditions. Using the learned behaviors, the embodiments can autonomously migrate application processing between clustered storage devices to meet the SL response time goals.

Advantageously, the embodiments disclosed herein provide a distributed learning system that enables each host application and each storage device to determine ideal placements and/or allocations of resources (e.g., software and/or hardware resources) to meet SL performance goals.

For instance, the embodiments can include active-active clustered storage devices that can be configured with non-disruptive migration tools. Additionally, the embodiments, can perform multi-dimensional modeling techniques designed to classifying performance metrics corresponding to each storage device and each application. For example, the embodiments can include one or more support vector machines configured to discriminate between different workloads (e.g., as represented by one or more load vectors) that can identify loads each storage device can handle while sustaining SL response time targets. Using the load vectors, the embodiments use one or more distributed gradient descent techniques disclosed herein to migrate (e.g., load-balance) application I/O processing between clustered storage devices.

Advantageously, the gradient descent techniques enable the embodiments to minimize periods in which each clustered storage device is unable to sustain response time targets. The gradient descent techniques can further be configured to generate application I/O migration schedules. In embodiments, the techniques disclosed herein can generate application I/O migration schedules that trigger application I/O migration to ensure the clustered storage devices are performing according to a highest possible performance margin window. The gradient descent techniques disclosed herein can also be configured to migrate each application model and storage device model generated by a storage device of the cluster to a target migration storage device. By migrating the models, the embodiments can, advantageously, generate robust predictions of potential workload conditions of each clustered storage device and/or the entire storage device cluster.

Figure 1:
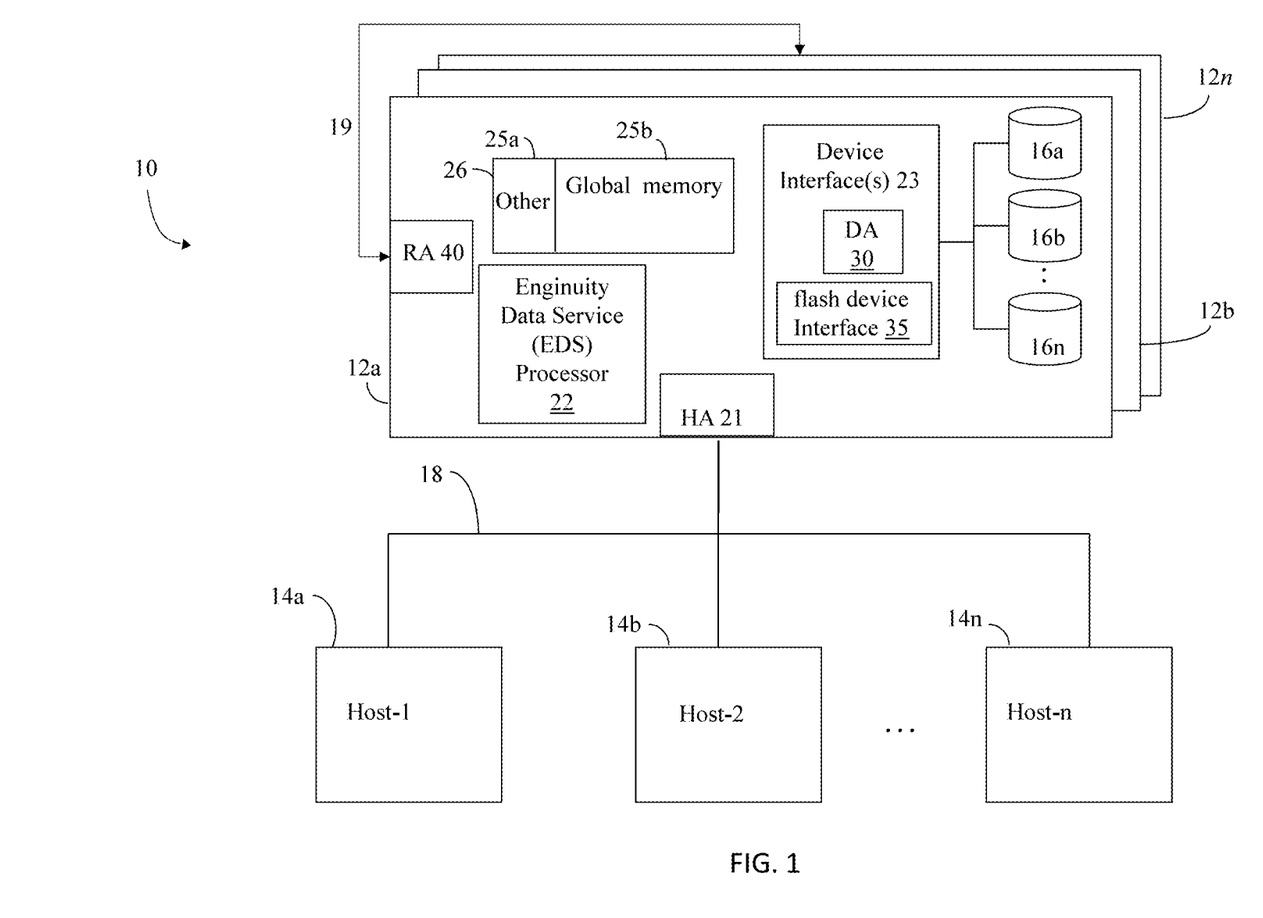
FIGS. 1-1A are block diagram of a storage system and storage array cluster of a storage area network (SAN) in accordance with example embodiments disclosed herein.
Figure 1A:
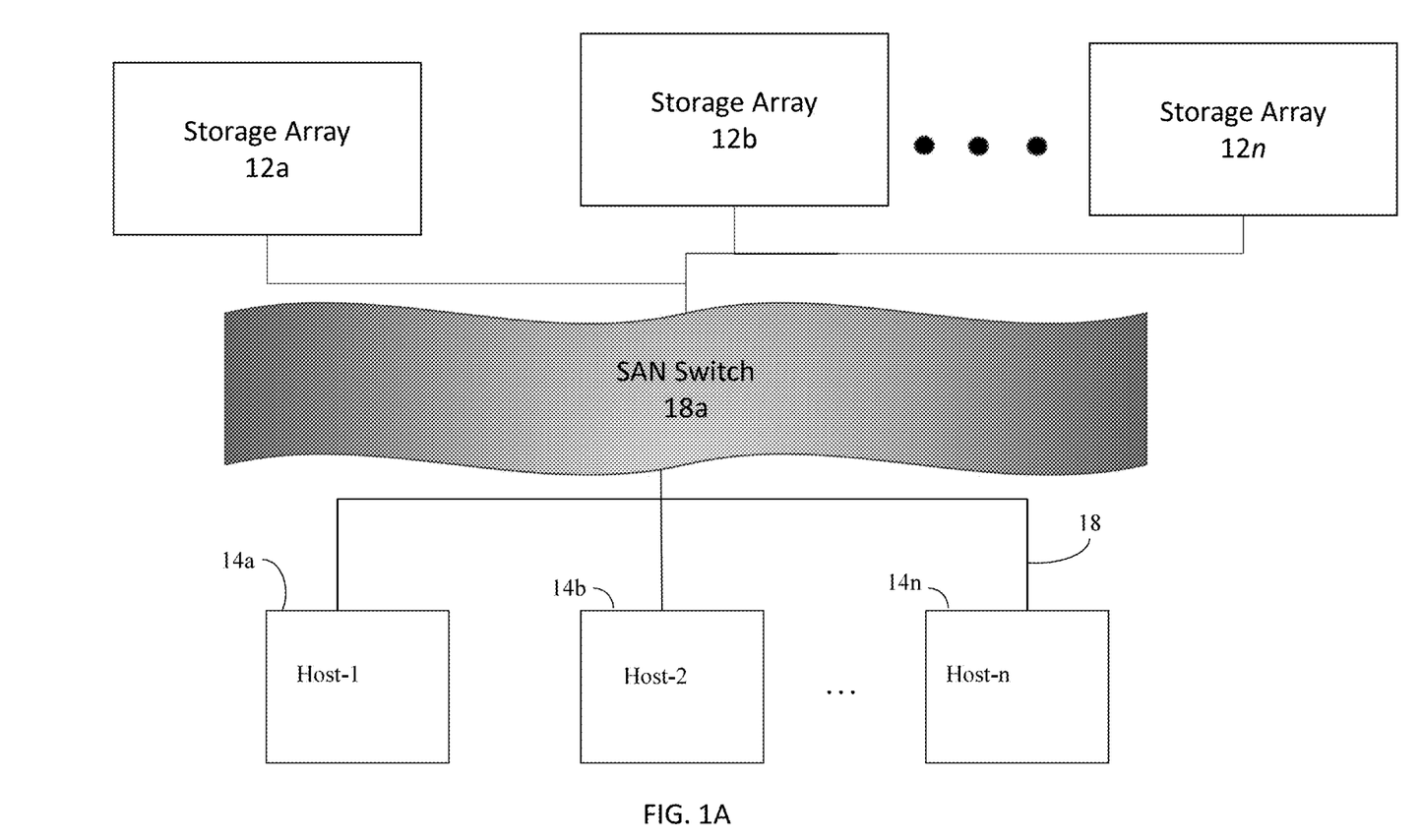

Referring to FIGS. 1-1A, an example system 10 includes data storage systems 12a-n (collectively referred to herein as "data storage system 12" or system 12). In embodiments, the systems 12a-n can represent a cluster of storage devices that are configured to distribute workloads between each other. In additional embodiments, the cluster 12a-n can be an active-active clustered storage system. The clustered storage devices 12a-n can be communicatively coupled via communications medium 19.

The system 12 is connected to host systems 14a-14n through communication medium 18. In embodiments, the hosts 14a-14n can access the data storage system 12, for example, to perform input/output (I/O) operations or data requests. The communication mediums 18-19 can be any one or more of a variety of networks or other type of communication connections as known to those skilled in the art. In embodiments, the communication mediums 18-19 may be a network connection, bus, and/or other type of data link, such as a hardwire or other connections known in the art. For example, the communication mediums 18-19 may be the Internet, an intranet, network (including a Storage Area Network (SAN)) or other wireless or other hardwired connection(s) by which the host 14a-14n can access and communicate with the data storage system 12 such as. The hosts 14a-14n can also communicate with other components included in the system 10 via the communication medium 18. In embodiments, each of the hosts 14a-n can access the storage array cluster 12a-n via, e.g., a SAN switch 18a.

In embodiments, the San switch 18a is a Fibre Channel (FC) switch employing an FC communication protocol. The FC switch examines data packet headers of I/O operations or data requests, determines their respective origin and destination, and sends the packets to the intended storage system.

Each of the hosts 14a-14n and the data storage system 12 can be connected to the communication medium 18 by any one of a variety of connections as may be provided and supported in accordance with the type of communication medium 18. The processors included in the hosts 14a-14n may be any one of a variety of proprietary or commercially available single or multi-processor system, such as an Intel-based processor, or other type of commercially available processor able to support traffic in accordance with each embodiment and application.

It should be noted that the examples of the hardware and software that may be included in the data storage system 12 are described herein in more detail and can vary with each embodiment. Each of the hosts 14a-14n and data storage system 12 can all be located at the same physical site or can be located in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-14n and data storage system 12 can be connected to the communication medium may pass through other communication devices, such switching equipment that may exist such as a phone line, a repeater, a multiplexer or even a satellite.

Each of the hosts 14a-14n can perform different types of data operations in accordance with different types of tasks. In embodiments, any one of the hosts 14a-14n may issue a data request (e.g., including an input/output (I/O) operation) to the data storage system 12 to perform a data operation. For example, an application executing on one of the hosts 14a-14n can issue an I/O operation (e.g., a read or write operation) via one or more data requests to the data storage system 12.

It should be noted that although system 12 is illustrated as a single data storage system cluster, such as a single data storage array cluster, system 12 may also represent, for example, multiple data storage array clusters alone, or in combination with, other clustered data storage devices, systems, appliances, and/or components having suitable connectivity, such as in a SAN, in an embodiment using the embodiments herein. It should also be noted that an embodiment may include data storage arrays or other components from one or more vendors. In subsequent examples illustrated the embodiments herein, reference may be made to a single data storage array by a vendor, such as by DELL Technologies of Hopkinton, Mass. However, as will be appreciated by those skilled in the art, the embodiments herein are applicable for use with other data storage arrays by other vendors and with other components than as described herein for purposes of example.

The data storage system 12 may be a clustered data storage array. Each storage array in the cluster can include a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. The embodiments described herein can be used in an embodiment in which one or more of the devices 16a-16n are flash drives or devices. More generally, the embodiments herein may also be used with any type of SSD although following paragraphs can refer to a particular type such as a flash device or flash memory device.

The data storage array 12 may also include different types of adapters or directors, such as an HA 21 (host adapter), RA 40 (remote adapter), and/or device interface 23. Each of the adapters HA 21, RA 40 may be implemented using hardware including a processor with local memory with code stored thereon for execution in connection with performing different operations. The HA 21 may be used to manage communications and data operations between one or more host systems 14a-14n and the global memory (GM) 25b. In an embodiment, the HA 21 may be a Fibre Channel Adapter (FA) or another adapter which facilitates host communication. The HA 21 may be characterized as a front-end component of the data storage system 12 which receives a request from one or more of the hosts 14a-14n. The data storage array 12 can include one or more RAs (e.g., RA 40) that may be used, for example, to facilitate communications between data storage arrays (e.g., between the storage array 12 and the external storage device(s) 105). The data storage array 12 may also include one or more device interfaces 23 for facilitating data transfers to/from the data storage devices 16a-16n. The data storage interfaces 23 may include device interface modules, for example, one or more disk adapters (DAs) 30 (e.g., disk controllers), flash drive interface 35, and the like. The DA 30 can be characterized as a back-end component of the data storage system 12 which interfaces with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, may also be included in an embodiment.

Host systems 14a-14n provide data and access control information through channels to the storage systems 12, and the storage systems 12 may also provide data to the host systems 14a-14n also through the channels. The host systems 14a-14n do not address the drives or devices 16a-16n of the storage systems directly, but rather access to data can be provided to one or more host systems 14a-n from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array 12, may be accessed by multiple hosts allowing the hosts to share the data residing therein. The HA 21 may be used in connection with communications between a data storage array 12 and one or more of the host systems 14a-n. The RA 40 may be used in facilitating communications between two or more data storage arrays (e.g., device 12 and external device(s) 105). The DA 30 may be one type of device interface used in connection with facilitating data transfers to/from the associated disk drive(s) 16a-n and LV(s) residing thereon. A flash device interface 35 may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA 30, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA 30 that accomplishes the foregoing by creating job records for the different LVs associated with a device. These different job records may be associated with the different LVs in a data structure stored and managed by each device interface.

Each of the clustered storage devices 12 can include an Enginuity Data Service (EDS) processor 22. The EDS processor 22 can be configured to generate distributed workload models of the storage devices 12a-n. Using the distributed workload models, the EDS processor 22 can autonomously migrate application I/O processing between the storage devices 12a-n to meet a client's (e.g. a user of the hosts 14a-n) SL response time targets. For example, the EDS processor 22 can use one or more machine learning (ML) engines to autonomously migrate application I/O processing between the storage devices 12a-n. In embodiments, the ML engines can include a support vector engine that includes, e.g., a hinge-loss algorithm configured to ingest service level response times and the workload models, amongst other storage device parameters and telemetry information. Using the ingested information, the one or more ML engines can learn behaviors of each clustered storage device under a variety of workload conditions. Based on the learned behaviors, the EDS processor 22 can autonomously migrate application processing between clustered storage devices to meet the SL response time goals.

Although the EDS processor 22 is depicted within the system 12, it should be noted that the EDS processor 22 may exist external to the data storage system 12. Accordingly, the processor 22 may communicate with the data storage system 12 using any one of a variety of communication connections. In one embodiment, the EDS processor 22 may communicate with the data storage system 12 through three different connections, a serial port, a parallel port and using a network interface card, for example, with an Ethernet connection. Using the Ethernet connection, for example, the EDS processor 22 may communicate directly with DA 30 and HA 21 within the data storage system 12.

Figure 2:
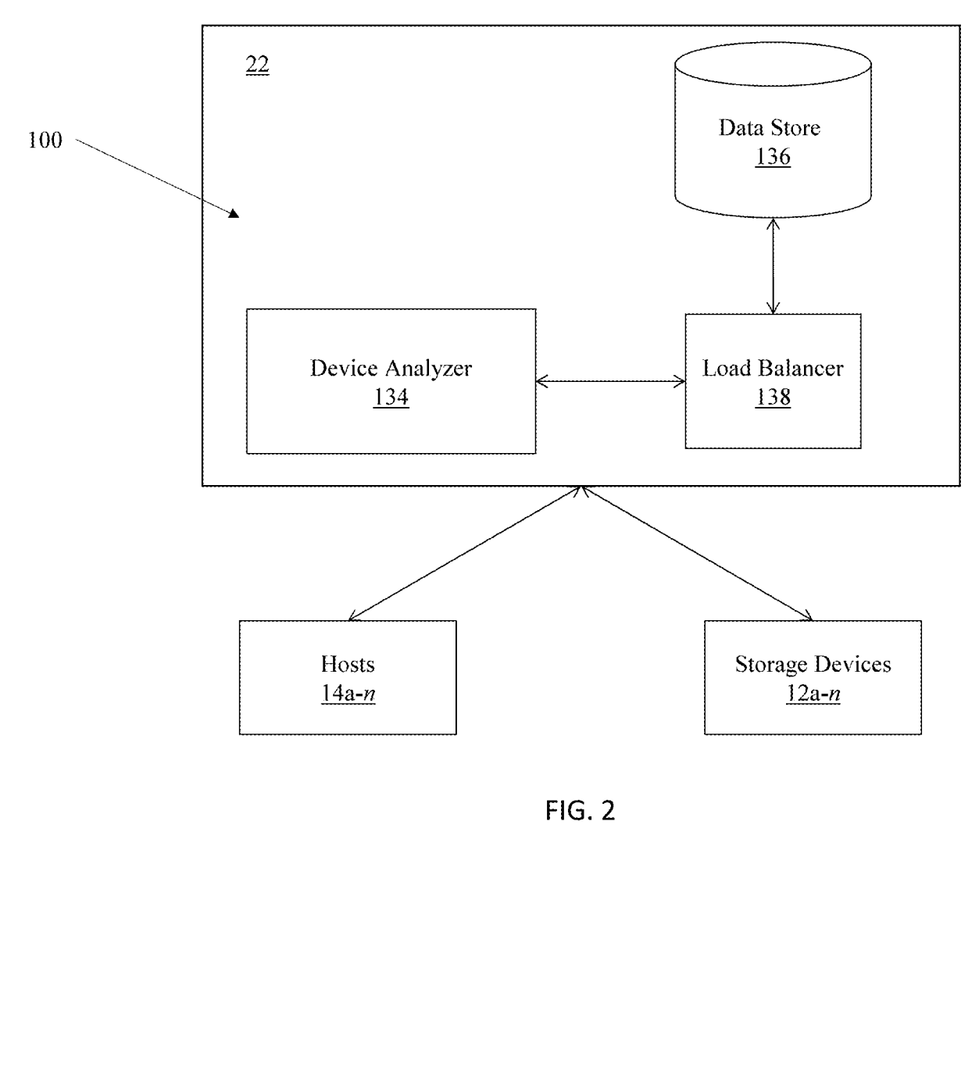
FIG. 2 is a block diagram of an Enginuity Data Service (EDS) processor in accordance with example embodiments disclosed herein.

Referring to FIG. 2, an EDS processor 22 can include elements 100 (e.g., software and hardware elements). It should be noted that the EDS processor 22 may be any one of a variety of commercially available processors, such as an Intel-based processor, and the like. Although what is described herein shows the elements 100 residing in the EDS processor 22, all or portions of the illustrated elements 100 may also reside elsewhere such as, for example, on HA 21 or any of the host systems 14*a*-14*n* of FIG. 1. In other embodiments, the EDS processor 22 can be a parallel processor such as a graphical processing unit (GPU).

In embodiments, one of the elements 100 of the EDS processor 22 can include a storage device analyzer 134. The analyzer 134 can collect data from the storage devices 12*a* of FIG. 1 and its components via, e.g., a Fibre channel. The components can include elements such as components 16*a*-*b*, 21-23, 25*a*-*b*, 26, 30, 35, and 40 of device 12*a* depicted in FIG. 1, amongst other known storage device components. Additionally, the analyzer 134 can obtain data corresponding to one or more external devices (e.g., devices 12*b*-*n* of FIG. 1) grouped with device 12*a* to form clustered array of storage devices. In embodiments, the storage devices 12*a*-*n* can include one or more daemons communicatively coupled to and configured to monitor one or more storage device components. For example, the daemons can generate log files that record activities of each storage device and their respective components. Accordingly, the analyzer 134 can collect the data via one or more communication push and/or pull techniques to retrieve the log files generated by each daemon.

The analyzer 134 can store the data in data store 136. In embodiments, the collected data can include real-time and/or historical storage device parameters, configuration information, and telemetry data. For example, the collected data can include workload information, I/O types (e.g., read/write percentages), I/O sizes, and SLs associated with each I/O, activity types, performance (e.g., response times), and cache hit rates, amongst other storage device data. Activity types can be one or more of Online Transaction Processing (OLTP), Teradata, random, and sequential I/O streams.

In embodiments, the analyzer 134 can segment the data into time-intervals corresponding to, e.g., time stamps included in each piece of data for each model. For example, the analyzer 134 can be configured to group the data into predetermined time-intervals. In other examples, the analyzer 134 can use one or more pattern recognition techniques to dynamically cluster the data into one or more time-intervals. In other embodiments, each daemon can be configured to conduct time series measurements to generate log files that group storage device and/or storage device component data into sample time-intervals. For example, a sample time-interval can be five (5) minutes, and each daemon can conduct activity measurements during each interval to generate log files that include the data that can include workload and performance data.

Figure 3:
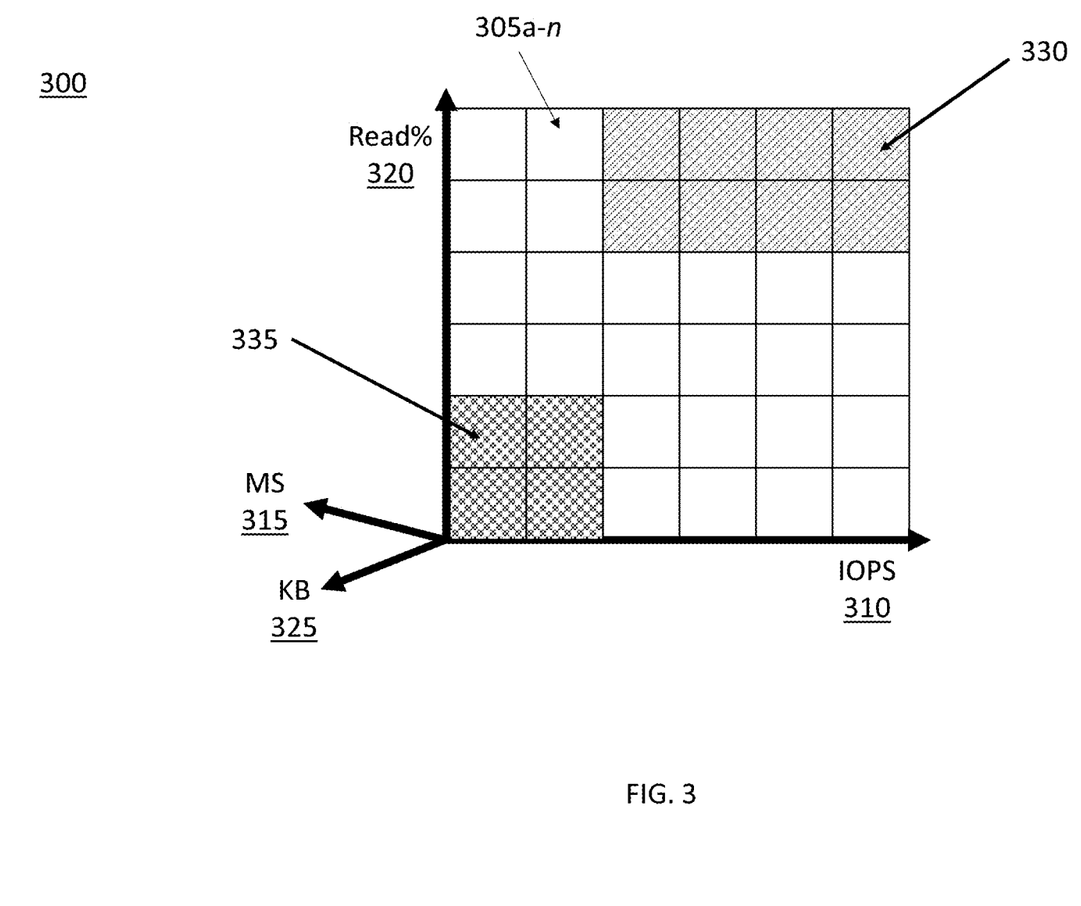
FIG. 3 illustrates an application model in accordance with example embodiments disclosed herein.
Figure 4:
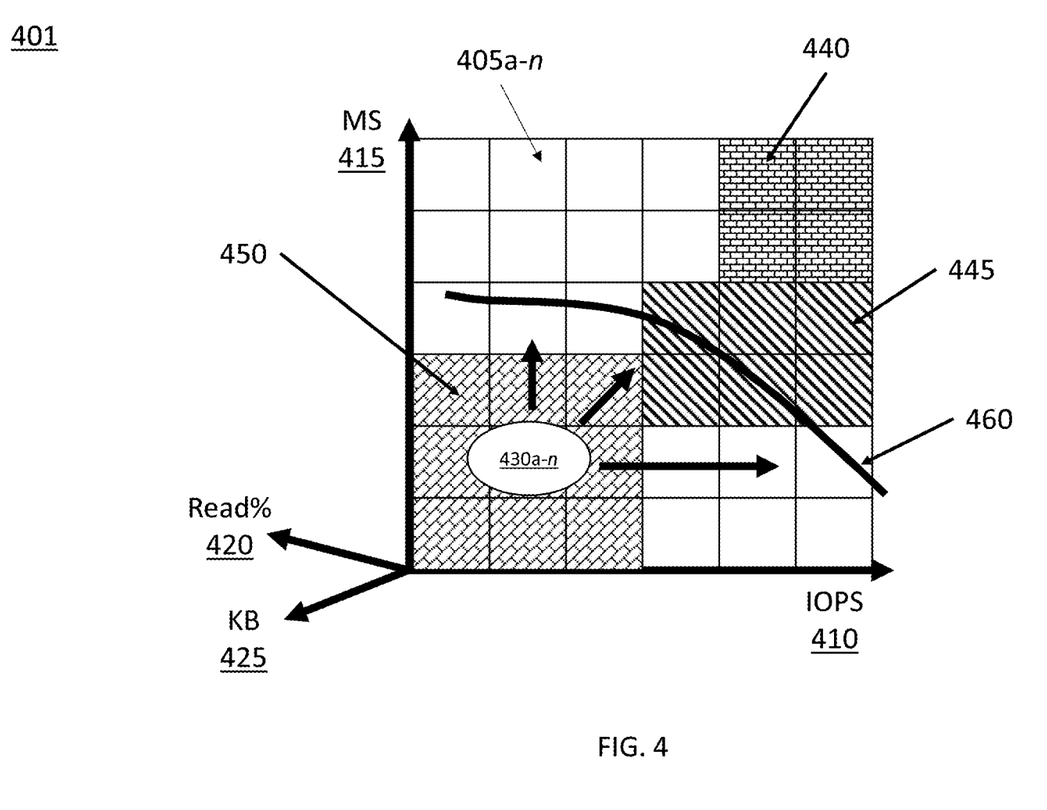
FIG. 4 illustrates a storage device model in accordance with example embodiments disclosed herein.

Using the segmented data, the analyzer 134 can generate one or more multi-dimensional workload models such as models 300 and 400 illustrated by FIGS. 3-4 by, e.g., aggregating the segmented data based on each time-interval. The generated multi-dimensional workload models can include a one or more: application models for each application run by hosts 14*a*-*n* and storage device models for each of the devices 12*a*-*n* of FIG. 1. The analyzer 134 can store the models in data store 136. Each application model can characterize different load permutations corresponding to each application to determine application response times as described in greater detail with respect to FIG. 3. Each storage device model can characterize each storage device's ability to achieve performance levels (e.g., response times) under a variety of load conditions as described in greater detail with respect to FIG. 3.

In embodiments, the analyzer 134 can include one or more storage device machine learning (ML) engines (not shown) configured to ingest information including, e.g., the storage device models, application models, and/or one or more portions of the collected data. In response to ingesting the information, the storage device ML engines can include and use one or more processors configured to identify and learn behaviors of each clustered storage device under a variety of workload conditions. In embodiments, the storage device ML engines can be configured with a hinge-loss processor that evaluates the ingested information. In embodiments, the hinge-loss processor can be designed to use response times (e.g., service level (SL) response times) included in the storage device models to train a support vector machine (not shown). Once trained, the support vector machine can determine an amount of additional load each storage device can sustain for any given performance requirement (e.g., SL response time targets). For example, the support vector machine can generate one or more delta load vectors for each storage device. In embodiments, each delta load vector can represent one or more potential workload permutations. In further embodiments, each delta load vector can be used to predict additional workloads that each device can sustain. Further, each delta load vector can identify additional workloads that each storage device can handle to maintain response time targets.

In further embodiments, the analyzer 134 can include one or more application ML engines (not shown) configured to ingest information including, e.g., the storage device models, application models, output from the storage device ML engines, and/or one or more portions of the collected data. In response to ingesting the information, the application ML engine can include and use one or more processors configured to identify and learn behaviors of each application and/or processing response times of each application I/O operation under a variety of workload conditions for each storage device. In embodiments, the application ML engine can be configured with an inverted hinge-loss processor (not shown) (e.g., inverted with respect to the hinge-loss processor used by the storage device ML engines). The inverted hinge-loss processor can be designed to ingest the learned behaviors of each application and each delta load vector for each application I/O operation and storage device. Using the ingested data, the inverted hinge-loss processor can generate one or more breaking load vectors for each storage device. Each storage device's one or more breaking load vectors can be configured to predict which of each storage device's one or more delta load vectors (e.g., additional workloads) would cause each storage device to miss response time requirements. Accordingly, each breaking load vector can represent one or more workload permutations that would cause each storage device to fail to meet performance goals.

In embodiments, the analyzer 134 can partition both the application and storage device models based on model time-intervals. In embodiments, each model time-intervals can correspond a day of a week. Accordingly, the ML engines describe above can learn and predict behaviors of each application and storage device for any model time-interval (e.g., day of the week).

In embodiments, the analyzer 134 can store its generated models, vectors, predictions, and learned behaviors in data store 136. A load balancer 138 can retrieve the stored information generated by the analyzer from the data store 136. In other embodiments, the analyzer 134 can send its generated information directly to the load balancer 138. Using the generated data, the load balancer 138 can migrate application I/O processing between one or more of the clustered storage devices. In embodiments, the load balancer 138 can perform application I/O migrations to minimize periods in which each clustered storage device is unable to sustain response time targets. Using one or more of the techniques described herein, the analyzer 134 can perform application I/O processing migrations via an online network (e.g., internet) without disrupting application and/or host operations or behaviors.

In embodiments, the balancer 138 can include one or more processors (not shown) that are configured to perform one or more gradient descent techniques. The gradient descent techniques can be configured to minimize a time spent (e.g., above a threshold) by each clustered storage device beyond their respective breaking load vectors corresponding to each application. The threshold can be predetermined and/or dynamically determined based on a determination of a highest possible performance margin window of each clustered storage device and/or the entire storage device cluster. The highest performance margin window can correspond to load balanced scenarios in which each clustered storage device and/or the entire storage device cluster can achieve best possible response times.

For example, the processor(s) can obtain real-time telemetry data from a subject clustered storage device (e.g., device 12a of FIG. 1) in which the balancer 138 resides and/or to which it is communicatively coupled. Using the real-time telemetry data, the balancer 138 can monitor and identify if the subject storage device has and/or is exceeding any breaking load vector. In response to determining that the subject device has and/or is exceeding a breaking load vector (e.g., beyond the threshold), the balancer 138 can broadcast the breaking load vector to other clustered storage devices (e.g., devices 12b-n of FIG. 1). The broadcast can also include a request for each clustered storage device's performance and/or workload related information.

In response to receiving the subject device's breaking load vector, each clustered storage device's load balancer can issue a response broadcast that includes each clustered device's respective breaking load vectors and/or performance and workload related information. The breaking load vectors can include information corresponding to each clustered device's time spent beyond their respective breaking load vectors.

In embodiments, the performance and/or workload related information can include each clustered device's delta load vectors (e.g., ability to handle additional workloads) as defined by their respective application models and/or storage device models. In further embodiments, the performance and/or workload related information can also include each clustered storage device's migration delta vectors. The migration delta vectors can correspond each clustered device's highest possible delta load vectors. Accordingly, each clustered storage device's migration delta vectors provides information that avoids migrations that could impact each clustered device's existing application processing performance (e.g., response times).

In embodiments, each clustered device's load balancer can generate respective migration delta vectors from migration information included in the broadcast received from the subject device's load balancer 138. The migration information can correspond to the workload being migrated. For example, each clustered device's balancer can generate migration delta load vectors using application I/O size, application I/O type, available respective clustered device bandwidth, and/or available bandwidth of the entire cluster, amongst other migration information. Each device's load balancer can further segment the migration delta load vectors to, e.g., identify bandwidth shifts with respect to any given time-interval. The time-interval bandwidth shifts can, e.g., represent contiguous weekly bandwidth shifts. The contiguous weekly bandwidth shifts can identify each clustered device's highest possible delta load vectors to avoid impacting each clustered device's existing application processing performance.

In response to receiving the response broadcasts, the subject device's load balancer 138 can identify and migrate a portion of the subject device's workload to a target clustered storage device (e.g., device 12b) based on one or more parameters contained in the response broadcasts. In embodiments, the one or more parameters can include one or more of each clustered storage device's breaking load vectors, time spent beyond the breaking load vectors, and each clustered device's delta load vectors, and each clustered device's migration delta vectors, amongst other storage device and/or application I/O processing parameters.

Prior to migrating the workload to the target clustered storage device, the load balancer 138 can include one or more migration prediction processors configured to predict an impact of the migration on the subject device, the target device, and/or the entire storage device cluster. In embodiments, the predicted impact of the migration can correspond to changes to a performance outcome corresponding to one or more of the subject device, the target device, and/or the entire storage device cluster. For example, the performance outcome can correspond to changes to the breaking load vectors of one or more of the subject device, the target device, and/or the entire storage device cluster. In response to determining that acceptable performance outcome can be achieved by the migration, the load balance 138 can schedule the workload migration from the subject device to the target device. The acceptable performance outcome can correspond resulting predicted performance metrics of one or more of the subject device, the target device, and/or the entire storage device cluster. In embodiments, the schedule can be based on the target device's migration delta vectors.

In embodiments, the load balancer 138 can provide the target device with one or more of the subject device's generated application models during the migration. Accordingly, the target device's load balancer can process the subject device's generated application models to leverage any of the subject device's learned application behavior(s) to generate responses to requests for delta load vectors.

Referring to FIG. 3, an example application model 300 that characterizes a given load permutation amongst a plurality of load permutations corresponding to a subject application (e.g., an application operated by one of the hosts 14*a-n* of FIG. 1). The application model 300 is a multi-dimensional model that can represent multiple dimensions corresponding to the subject application's workload and performance metrics. In embodiments, the dimensions represented by the application model 300 can include, e.g., I/O operations per second (IOPS) 310, I/O types (e.g., read %) 320, response times (e.g., in milliseconds (MS)) 315, and I/O sizes (e.g., in kilobytes (KB)) 325, amongst other application I/O processing related parameters. The application model 300 includes cells 305*a-n* that represent measured samples during the given load permutation. Accordingly, an application model can be generated for each possible load permutation by, e.g., an EDS processor (e.g., processor 22 of FIGS. 1-2). As illustrated, the application model 300 includes cell region 330 and cell region 335. The region 330 corresponds to conditions in which the subject application is predicted to run relatively high IOPS that include a larger percentage of reads versus writes. The region 335 corresponds to conditions in which the subject application is predicted to perform low IOPS that include a larger percentage of writes versus reads.

Referring to FIG. 4, an example storage device model 400 is illustrated. The model 400 characterizes response times under a given load permutation amongst a plurality of load permutations corresponding to a subject storage device (e.g., device 12*a* of FIG. 1). The model 400 is a multi-dimensional model that can represent multiple dimensions corresponding to the subject device's workload and performance metrics corresponding to the one load permutation. In embodiments, the dimensions represented by the model 400 can include, e.g., I/O operations per second (IOPS) 410, I/O types (e.g., read %) 420, response times (e.g., in milliseconds (MS)) 415, and I/O sizes (e.g., in kilobytes (KB)) 425, amongst other application I/O processing related parameters. The model 400 includes cells 405*a-n* that represent measured samples during the given load permutation. Accordingly, a device model can be generated for each possible load permutation by, e.g., an EDS processor (e.g., processor 22 of FIGS. 1-2). As illustrated, the model 400 includes cell region 440, cell region 445, and cell region 450. The region 440 corresponds to predictions of the subject storage device's response times during conditions of high IOPS. The region 445 corresponds to predictions of the subject storage device's response times during conditions of lower IOPS than region 440. The region 450 corresponds to predictions of the subject storage device's response times during conditions of lowest IOPS.

The model 400 includes delta load vectors 430*a-n* that represent additional loads that the subject storage device can sustain. Additionally, the model 400 includes a breaking load vector 460 that defines those sustainable loads that the subject device can handle in accordance with one or more response time goals (SL response times established by a storage device customer). In this example, load conditions below the horizon defined by the breaking load vector 460 are considered to satisfy one or more response time goals. In contrast, load conditions above the breaking load vector 460 horizon are not predicted to satisfy any response time goal.

The following text includes details of one or more methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

Figure 5:
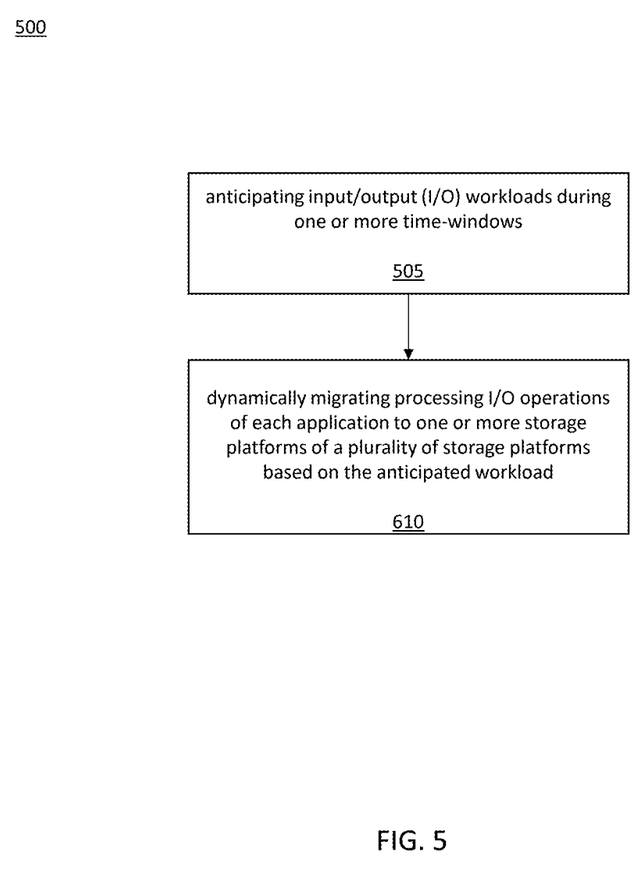
FIG. 5 is a flow diagram of a method for load balancing application processing between storage devices in accordance with example embodiments disclosed herein.

Referring to FIG. 5, a method 500 can be executed by, e.g., an EDS processor (e.g., the EDS processor 22 of FIGS. 1-2) and/or any element of device 12*a* of FIG. 1. The method 500 describes steps for load balancing application processing between storage platforms (e.g., platforms 12*a-n* of FIG. 1). At 505, the method 500 can include anticipating input/output (I/O) workloads during one or more time-windows. Each I/O workload can comprise one or more I/O operations corresponding to one or more applications. The method 500, at 510, can also include dynamically migrating processing I/O operations of each application to one or more storage platforms of a plurality of storage platforms based on the anticipated workload. It should be noted that each step of the method 500 can include any combination of techniques implemented by the embodiments described herein.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described embodiments can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described embodiments can be implemented in a distributed computing system that includes a back-end component. The back-end component can, for example, be a data server, a middleware component, and/or an application server. The above described embodiments can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. A method comprising:
   anticipating input/output (I/O) workloads during one or more time-windows, each I/O workload comprising one or more I/O operations corresponding to one or more applications, wherein anticipating the IO workloads includes:
   determining an amount of additional workload each storage platform can process based on one or more response time goals associated with each Application's I/O operations, and
   determining each storage array's breaking workload, wherein a breaking workload corresponds to an amount of time each storage array exceeds the one or more response time goals; and
   dynamically migrating processing of each Application's corresponding I/O operations to one or more storage platforms of a plurality of storage platforms based on the anticipated workload.

2. The method of claim 1 further comprising determining the one or more response time goals associated with each Application.

3. The method of claim 2 further comprising determining loads of each of the storage platforms.

4. The method of claim 3 further comprising predicting I/O operation patterns of the anticipated I/O workloads.

5. The method of claim 4, wherein predicting the I/O operation patterns includes determining amounts of each type of I/O operation in each anticipated I/O workload, wherein each I/O operation type includes at least a read or write (R/W) operation.

6. The method of claim 5 further comprising predicting each storage platform's response times for processing each Application's I/O operations.

7. The method of claim 6, wherein predicting each response time includes determining one or more of each storage platform's configuration, I/O operation types in each anticipated workload, and each I/O operation's size.

8. The method of claim 6, wherein predicting each storage platform's response times for processing each Application's I/O operations includes:
   determining each storage platform's current workload; and
   monitoring each storage platform's response times for processing I/O operations of the current workload.

9. The method of claim 8, wherein dynamically migrating processing of each Application's I/O operations to one or more storage platforms includes selecting the one or more storage platforms based on one or more of the amounts of additional workload each storage platform can process and each storage array's breaking workload.

10. An apparatus comprising a memory and at least one processor configured to:
    anticipate input/output (I/O) workloads during one or more time-windows, each I/O workload comprising one or more I/O operations corresponding to one or more applications, wherein anticipating the IO workloads includes:
        determining an amount of additional workload each storage platform can process based on one or more response time goals associated with each Application's I/O operations, and
        determining each storage array's breaking workload, wherein a breaking workload corresponds to an amount of time each storage array exceeds the one or more response time goals; and
    dynamically migrate processing of each Application's corresponding I/O operations to one or more storage platforms of a plurality of storage platforms based on the anticipated workload.

11. The apparatus of claim 10 further configured to determine the one or more response time goals associated with each Application.

12. The apparatus of claim 11 further configured to determine loads of each of the storage platforms.

13. The apparatus of claim 12 further configured to predict I/O operation patterns of the anticipated I/O workloads.

14. The apparatus of claim 13 further configured to predict the I/O operation patterns by determining amounts of each type of I/O operation in each anticipated I/O workload, wherein each I/O operation type includes at least a read or write (R/W) operation.

15. The apparatus of claim 14 further configured to predict each storage platform's response times for processing each Application's I/O operations.

16. The apparatus of claim 15 further configured to predict each response time by determining one or more of: each storage platform's configuration, I/O operation types in each anticipated workload, and each I/O operation's size.

17. The apparatus of claim 15, wherein predicting each storage platform's response times for processing each Application's I/O operations includes:
    determining each storage platform's current workload; and
    monitoring each storage platform's response times for processing I/O operations of the current workload.

18. The apparatus of claim 17, wherein dynamically migrating processing of each Application's I/O operations to one or more storage platforms includes selecting the one or more storage platforms based on one or more of the amounts of additional workload each storage platform can process and each storage array's breaking workload.

* * * * *